UNITED STATES PATENT OFFICE.

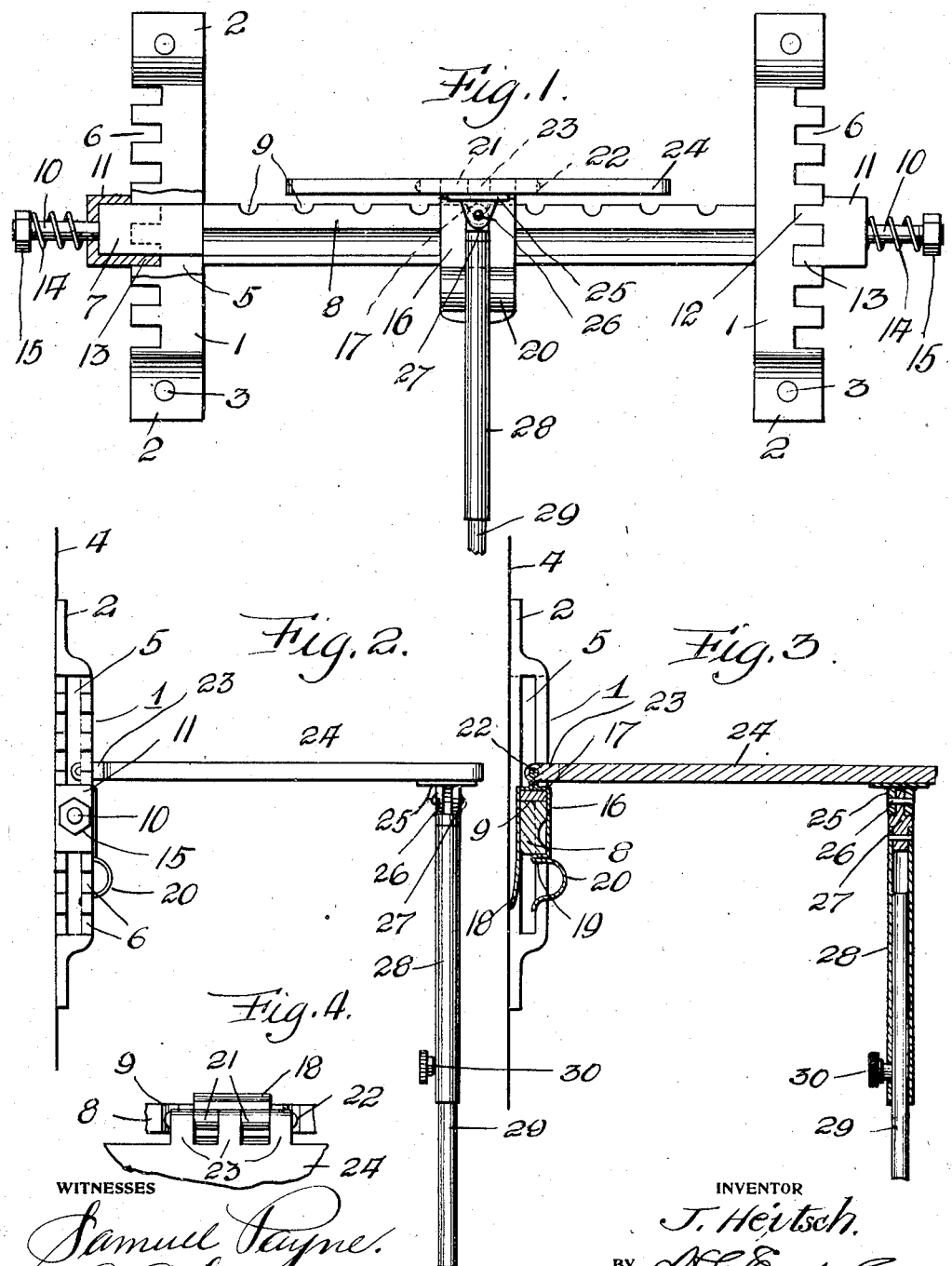

JOHANN HEITSCH, OF NEW CASTLE, PENNSYLVANIA.

DROP-SEAT FOR LOCOMOTIVE-CABS.

1,042,913.

Specification of Letters Patent.

Patented Oct. 29, 1912.

Application filed March 22, 1912. Serial No. 685,638.

*To all whom it may concern:*

Be it known that I, JOHANN HEITSCH, a citizen of the United States of America, residing at New Castle, in the county of Lawrence and State of Pennsylvania, have invented certain new and useful Improvements in Drop-Seats for Locomotive-Cabs, of which the following is a specification, reference being had therein to the accompanying drawing.

This invention relates to drop seats for locomotive cabs, and the primary object of my invention is to provide an adjustable drop seat that can be advantageously used by the occupants of a locomotive cab or other small compartment, the seat being constructed whereby it can be dropped out of the way when the engineer desires to move about in the cab or operate the reversing bar of the locomotive.

Another object of this invention is to provide a drop seat that can be adjusted in height and longitudinally adjusted, whereby the seat can be properly positioned for an engineer to be convenient to the throttle of the locomotive and other devices in order that the locomotive is under the control of an engineer when sitting at a cab window.

With the above and other objects in view, the invention resides in the novel construction, combination and arrangement of parts to be hereinafter specifically described and then claimed.

Reference will now be had to the drawing, wherein like numerals denote corresponding parts throughout the several views, in which:—

Figure 1 is a front elevation of the drop seat partly broken away and partly in section, Fig. 2 is a side elevation of the same, Fig. 3 is a cross sectional view of the seat, and Fig. 4 is a plan of a portion of the same.

The reference numeral 1 denotes parallel vertical brackets having the upper and lower ends thereof provided with apertured lugs 2 that are secured by screws 3 or other fastening means to the wall 4 of a locomotive cab or any suitable support. The brackets 1 have longitudinal slots 5 and the outer edges of said brackets are provided with transverse equally spaced slots 6 forming racks.

Extending through the slots 5 are the reduced ends 7 of a supporting bar 8 that has the upper edge thereof provided with transverse notches 9. The reduced ends 7 are provided with stems 10 and movably mounted upon said stems and inclosing the extreme ends of the bar 8 are locking members 11 having side teeth 12 and bottom teeth 13, said teeth engaging in the racks formed by the transverse slots 6 of the brackets 1. The locking members 11 are retained in engagement with said brackets by coiled compression springs 14 encircling the stems 10 between said members and nuts 15 mounted upon the outer ends of said stems.

Adjustably mounted upon the supporting bar 8 is a metallic strap 16 provided with a notch member 17 that engages in one of the notches 9. The strap 16 is made of a resilient material and the rear end 18 thereof engages the wall 4 or the support of the brackets 1. The forward end of the strap is bent to provide a catch 19 and a handle 20, said catch engaging the under side of the supporting bar 8 and retaining the notch member 17 in the notch 9. By gripping the handle 20 and moving the catch 19 out of engagement with the under side of the supporting bar 8, the strap 16 can be elevated and shifted to place the notch member 17 in either one of the notches 9.

The strap 16 is provided with barrels 21 and pivotally connected to said barrels by a pin 22 are apertured lugs 23 carried by the rear edges of a seat 24. The bottom side of the seat 24, at the front edge thereof, is provided with a depending bearing 25 and pivotally mounted in said bearing by a pin 26 is the head 27 of a tubular or telescopic leg section 28 in which is slidably mounted a solid leg section 29. The solid leg section is adjustably held in the tubular leg section 28 by a set screw 30.

It is through the medium of the adjustable telescopic pivoted leg of the seat 24 and the locking members 11 of the supporting bar 8 that the seat 24 can be adjusted in height relatively to a floor, and it is through the medium of the strap 16 that the seat can be adjusted longitudinally relatively to the supporting bar 8. When the seat is not in use, the seat 24 is swung to a vertical position with the telescopic leg approximately in parallelism therewith.

It is thought that the operation and utility and the manner of assembling the parts of the seat will be apparent without further description, and while in the drawing there is illustrated a preferred embodiment of the invention, it is to be understood that the structural elements thereof are susceptible to such variations as fall within the scope of the appended claims.

What I claim is:—

1. In a drop seat, parallel slotted racks, a supporting bar having the ends thereof slidably mounted in said racks, spring pressed locking members carried by the ends of said bar for locking said bar relatively to said racks, a strap adjustably mounted upon said supporting bar, a seat having the rear edge thereof pivotally connected to said strap, and a telescopic pivoted leg carried by the forward edge of said seat.

2. A drop seat for the cabs of locomotives, comprising slotted brackets, a supporting bar having the ends thereof extending through said brackets and adjustably connected thereto, a strap adjustably mounted upon said supporting bar, a seat having the rear edge thereof pivotally connected to said strap, and a telescopic leg pivotally supported by said seat.

3. A drop seat for locomotive cabs, comprising slotted brackets, a supporting bar having the ends thereof extending through said brackets, spring pressed locking members arranged upon the ends of said bar for engaging said brackets and locking said bar relatively to said brackets, a strap adjustably mounted upon said supporting bar, a seat having the rear edge thereof pivotally connected to said strap, and a leg pivotally supported upon the forward edge of said seat.

4. A drop seat for locomotive cabs comprising parallel slotted racks, a notched supporting bar having the ends thereof extending through said racks, spring pressed locking members movably arranged upon the ends of said bars for engaging said racks, a strap movably mounted upon said supporting bar, a notch member carried by said strap for engaging in one of the notches of said bar, a seat having the rear edge thereof pivotally connected to said strap, and a telescopic leg pivotally connected to the forward edge of said seat.

In testimony whereof I affix my signature in the presence of two witnesses.

JOHANN HEITSCH.

Witnesses:
 RICHARD HILL,
 ISREAL MYERS.